United States Patent Office 3,702,800
Patented Nov. 14, 1972

---

3,702,800
CATIONIC WATER-SOLUBLE POLYVINYL ALCOHOL RETENTION AID
Andrew G. Tsuk and Charles C. Kirk, Laurel, Md., assignors to W. R. Grace & Co.
No Drawing. Original application Jan. 26, 1970, Ser. No. 5,965, now Patent No. 3,609,132. Divided and this application Jan. 29, 1971, Ser. No. 111,086
Int. Cl. D21h 3/40
U.S. Cl. 162—168                   1 Claim

ABSTRACT OF THE DISCLOSURE

This invention relates to a cationic water-soluble polyvinyl alcohol prepared from a water-soluble vinyl acetate/N-vinyl-N-methyl acetamide copolymer by hydrolysis. The hydrolyzed copolymer significantly enhances the retention of pigment particles by the cellulose fibers in a paper pulp slurry.

---

This is a division of application Ser. No. 5,965, filed Jan. 26, 1970, now U.S. Pat. No. 3,609,132.

It is known in the art to copolymerize vinyl acetate with N-vinyl-N-methyl acetamide. However, on hydrolysis in the presence of a base, only the vinyl acetate portion is hydrolyzed. It is also known to hydrolyze poly N-vinyl-N-methyl acetamide per se in the presence of concentrated hydrochloric acid by refluxing for an extended period. However, this method is inoperable to hydrolyze the copolymer of vinyl acetate and N-vinyl-N-methyl acetamide because polyvinyl alcohol is degraded by refluxing mineral acids. See British Pat. 1,082,016.

One object of the instant invention is to produce a hydrolyzed copolymer of vinyl acetate and N-vinyl-N-methyl acetamide wherein all the acetate groups are hydrolyzed to alcohol and at least 20% of the amide groups are hydrolyzed to the amine. Another object of the instant invention is to produce a process for making the aforesaid hydrolyzed copolymer product. Still another object of the instant invention is to produce a cationic water-soluble polyvinyl alcohol which increases the retention of pigments, e.g., $TiO_2$ pigments, by cellulose fibers in the paper-making process. Other objects will become apparent from a reading hereinafter.

Copolymerization of vinyl acetate and N-vinyl-N-methyl acetamide is well known to yield a nitrogen-containing water-soluble copolymer. The water-solubility of the aforesaid copolymer is due to the high content of the N-vinyl-N-methyl acetamide moiety in the copolymer i.e., at least 37 mole percent. One object of the instant invention is to produce a novel cationic, water-soluble polyvinyl alcohol. Another object of the instant invention is to produce a novel cationic water-soluble polyvinyl alcohol from a water-insoluble vinyl acetate/N-vinyl-N-methyl acetamide copolymer by hydrolysis whereby substantially all the acetate groups are hydrolyzed to alcohol and at least 20% of the amide groups are hydrolyzed to the amine. Yet another object of the instant invention is to produce a water-soluble polymer that increases the retention of pigments by cellulose fibers in the paper-making process. These and other objects will become apparent from a reading hereinafter.

The known copolymerization of vinyl acetate and N-vinyl-N-methyl acetamide can be accomplished, preferably in a nitrogen atmosphere in the presence of a free radical initiator e.g., azobisisobutyronitrile, in refluxing methanol to yield a nitrogen-containing, water insoluble, random copolymer of vinyl acetate and N-vinyl-N-methyl acetamide of the general recurring structure:

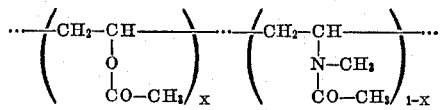

wherein X is the mole fraction of vinyl acetate.

The copolymer is then hydrolyzed by the process of the instant invention by refluxing in a solution of a mineral acid in alcohol, e.g. methanol or methanol and methyl acetate to yield a hydrolyzed cationic polyvinyl alcohol of the general structure:

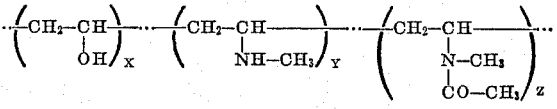

wherein X is 0.70–0.95, Y is at least 0.2 Z and $$X+Y+Z=1.0$$

In the hydrolysis, at least 20% of the amide and preferably in excess of 50% of the amide groups are hydrolyzed to the amine. The hydrolyzed copolymer can be recovered by evaporating off the alcohol but is preferably recovered as a solution in water.

It is critical in carrying out the hydrolysis of the instant invention that the copolymer has a mole ratio of vinyl acetate to N-vinyl-N-methyl acetamide of 70–95:30–5 respectively. Lesser amounts of vinyl acetate increase cost without substantial increase in cationic behavior.

If greater than 95 mole percent vinyl acetate is present, the ultimate cationic content is not enough for sufficient retention aid activity.

The amount of alcohol added to the hydrolysis reaction is an amount at least equal to the amount stoichiometrically required to combine with the acetate. Excesses up to 10 times the weight of unhydrolyzed copolymer can be employed if desired.

Instead of the methanol employed in the examples herein, any other lower alcohol, such as ethyl, isopropyl, propyl or butyl, can be used to carry out the hydrolysis. If it is found necessary to moderate the rate, the alcohol may be diluted by the addition of the respective acetate ester, as is shown in Example 4, wherein methyl acetate was employed.

Addition of 0.01–0.5 percent (of the dried pulp weight) of the hydrolyzed copolymer to a pulp/$TiO_2$ pigment slurry vastly improves the pigment retention of a formed paper-sheet.

The cationic content of the hydrolyzed copolymer was found by the following method. The aqueous solution of the copolymer was titrated with a standard base, e.g., NaOH, and a curve showing pH vs. amount of base added is drawn. A buffer region is visible at pH values over 7.5 corresponding to the cationic groups generated. The amount of base necessary to raise the pH from 8 to 10 is taken as equivalent to the cationic groups present.

The following examples will explain, but expressly not limit, the instant invention.

PREPARATION OF WATER INSOLUBLE, VINYL ACETATE/N-VINYL-N-METHYL ACETAMIDE COPOLYMER

Example 1

To a two liter round bottom flask equipped with stirrer, reflux condenser, gas inlet and outlet and thermometer was added 400 g. methanol, 450 g. distilled vinyl acetate and 50 g. distilled N-vinyl-N-methyl acetamide. After nitrogen gas purging of the solution and flask, 1.0 g. of azabisisobutyronitrile initiator was added to the solution. Stirring was continued and the solution was heated to reflux. Two more additions of 1.0 g. azobisisobutyronitrile initiator were made at 1 hour intervals. Unreacted vinyl acetate monomer was then removed by distillation with more methanol added until the temperature reached 64° C. The final solution solids was 34.3% in methanol, the conversion to copolymer was 67% and the copolymer had an intrinsic viscosity ($\eta$) in methanol at 30° C. of 0.5. The compolymer had an elemental analysis of 57.03% C; 8.23% H and 2.06% N.

Example 2

To a 500 ml. three neck flask equipped with nitrogen inlet, stirrer, thermometer, and a reflux condenser was added 95 g. distilled vinyl acetate, 80 g. methanol, 5 g. N-vinyl-N-methyl acetamide. After nitrogen gas purging of the solution and flask, 0.2 g. of azobisisobutyronitrile initiator was added to the solution. Stirring was continued and the solution was heated to reflux. Two more additions of 0.2 g. azobisisobutyronitrile initiator were made at 1 hour intervals before the reaction was shut down after 3 hours refluxing. Unreacted vinyl acetate monomer was removed by distillation with more methanol added until the temperature reached 64.5° C. The final solution solids was 30.7%, the conversion to copolymer was 52% and the copolymer had an intrinsic viscosity in methanol at 30° C. of 0.5. The copolymer had an elemental analysis of 55.67% C; 6.81% H and 1.37% N.

Example 3

To a 500 ml. three neck flask equipped with nitrogen inlet, stirrer, thermometer, and reflux condenser was added 80 g. of distilled vinyl acetate, 20 g. N-vinyl-N-methyl acetamide and 80 g. methanol. After nitrogen gas purging of the solution and flask, 0.2 g. of azobisisobutyronitrile initiator was added to the solution with stirring and the solution was heated to reflux. Two more additions of 0.2 g. azobisisobutyronitrile initiator were made at 1 hour intervals. The total refluxing time was 3 hours. Unreacted vinyl acetate monomer was removed by distillation with more methanol added until the temperature reached 64.5° C. The percent solids in the final solution was 38.4% in methanol, the conversion to copolymer was 54% and the copolymer had an intrinsic viscosity in methanol at 30° C. of 0.66. The copolymer had an elemental analysis of 62.52% C; 8.86% H and 4.20% N.

PREPARATION OF HYDROLYZED COPOLYMER

Example 4

43.8 g. of the copolymer solution from Example 1, 31.0 g. methanol and 25.0 g. methyl acetate were charged to a 250 ml. round bottom flask equipped with stirrer, reflux condenser, and thermometer. The contents of the flask were stirred and heated to reflux temperature. A total of 2.8 g. of concentrated HCl (36%) was added to the refluxing solution in 4 equal portions during the 40 hour reaction period. The copolymer precipitated from solution and the reaction was stopped. The polymer was recovered in aqueous solution by steam distilling off the methanol. Titration of a sample of the aqueous solution of the copolymer by the method set out supra indicated a cationic content of 0.9 meq. N/g. copolymer. The isolated copolymer contained 2.85% N determined by combustion and will be referred to as Copolymer A.

Example 5

97.7 g. of the copolymer solution from Example 2 and 31.0 g. methanol were charged to a 500 ml. round bottom flask equipped with a stirrer, reflux condenser, and thermometer. The contents of the flask were stirred and heated to reflux temperature. A total of 7.6 g. of concentrated HCl (36%) was added to the refluxing solution and the refluxing reaction was carried out for 3 hours and 45 minutes at which time the copolymer precipitated from the solution and the reaction was discontinued. The polymer was recovered in aqueous solution by steam distilling off the methanol. Titration of a sample of an aqueous solution of the copolymer indicated a cationic content of 1.0 meq. N/g. copolymer. The isolated copolymer contained 1.81% N and will be referred to hereinafter as Copolymer B.

Example 6

78.2 g. of the copolymer solution from Example 3, and 121.8 g. methyl alcohol were charged to a 500 ml. three neck flask equipped with stirrer, thermometer, and reflux condenser. The contents of the flask were stirred and heated to reflux temperature. A total of 8.6 g. of concentrated HCl (36%) was added to the refluxing solution during the 26 hour reaction period. The copolymer did not precipitate from solution and when the reaction was discontinued, the polymer was recovered in aqueous solution by steam distilling off the methanol. Titration of a sample of the aqueous solution of the copolymer indicated a cationic content of 1.6 meq. N/g. copolymer. The isolated copolymer contained 6.39% N and will be referred to hereinafter as Copolymer C.

Example 7

Example 6 was repeated except that 17 g. of concentrated HCl (36%) was added to the refluxing solution. After 25 hours the copolymer precipitated from solution and was recovered in aqueous solution by steam distilling off the methanol. Titration of a sample of the aqueous solution of the copolymer indicated a cationic content of 2.8 meq. N/g. copolymer.

PIGMENT RETENTION EXAMPLES

Example 8

To 500 ml. of a 1% by weight slurry of well beaten paper pulp (Raybrook P bleached sulfite) is added 50 ml. of a 2% by weight slurry of $TiO_2$ pigment (Ti Pure PC manufactured by DuPont) and with stirring 450 ml. of additional water and the below listed hydrolyzed copolymer additives. The treated pulp slurry was formed into a uniform sheet 7¾ inches in diameter by draining on the screen of a hand sheet maker, model C, manufactured by Valley Sheet Mold Co. The dried, pressed sheet was sampled for ash determination with the following results as shown in Table I.

TABLE I

| Composition: | Percent ash |
| --- | --- |
| Control (5000 p.p.m. pulp and 1000 p.p.m. $TiO_2$) | 0.5–1.0 |
| Control+4 p.p.m. copolymer A | 5 |
| Control+4 p.p.m. copolymer B | 7 |
| Control+2 p.p.m. copolymer C | 6 |
| Control+4 p.p.m. copolymer C | 9 |

Various other conventional pigments such as calcium carbonate, kaolin clay, etc. can also be retained in paper pulp by the hydrolyzed cationic copolymer of the instant invention.

What is claimed is:

1. A process for aiding the retention of pigments to alkaline type paper which comprises admixing 0.01 to 0.5% by weight of a paper pulp-pigment slurry of a cationic, water-soluble polyvinyl alcohol of the general structure

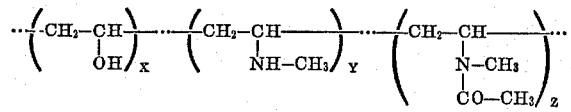

wherein X is 0.70–0.95, Y is at least 0.2 Z and $X+Y+Z=1.0$ into a paper pulp-pigment slurry, forming the thus treated slurry into a sheet and drying the tuhs formed sheet wherein X, Y and Z are respective mole fractions.

References Cited
UNITED STATES PATENTS 2,402,469   6/1946   Toland et al. _____ 162—168

S. LEON BASHORE, Primary Examiner

A. L. CORBIN, Assistant Examiner